United States Patent
Boyd et al.

(10) Patent No.: US 8,327,985 B2
(45) Date of Patent: Dec. 11, 2012

(54) TWO STAGE VIBRATION ISOLATOR

(75) Inventors: James Boyd, Glendale, AZ (US); Timothy Hindle, Peoria, AZ (US); Dale Thomas Ruebsamen, Glendale, AZ (US)

(73) Assignee: Honeywell International Inc., Morristown, NJ (US)

(*) Notice: Subject to any disclaimer, the term of this patent is extended or adjusted under 35 U.S.C. 154(b) by 771 days.

(21) Appl. No.: 12/489,128

(22) Filed: Jun. 22, 2009

(65) Prior Publication Data
US 2010/0320358 A1 Dec. 23, 2010

(51) Int. Cl.
*F16F 7/10* (2006.01)

(52) U.S. Cl. ............ 188/379; 188/298; 188/322.5; 188/380; 248/562

(58) Field of Classification Search ............ 188/266, 188/297, 298, 322.5, 378–380; 267/136; 248/561, 562, 563, 568
See application file for complete search history.

(56) References Cited

U.S. PATENT DOCUMENTS

| | | | |
|---|---|---|---|
| 2,079,391 A | 5/1937 | Wolfe | |
| 2,126,660 A | 8/1938 | Pogue | |
| 2,930,455 A * | 3/1960 | Williams | 188/298 |
| 3,469,661 A | 9/1969 | Hoffmann et al. | |
| 4,572,488 A | 2/1986 | Holmberg, Jr. et al. | |
| 4,595,167 A | 6/1986 | Tangorra et al. | |
| 4,722,505 A | 2/1988 | Kaiser | |
| 4,760,996 A * | 8/1988 | Davis | 267/122 |
| 4,768,627 A * | 9/1988 | Taylor | 188/280 |
| 4,815,574 A | 3/1989 | Taylor et al. | |
| 5,018,701 A | 5/1991 | Masaki et al. | |
| 5,046,471 A | 9/1991 | Schmid | |
| 5,180,148 A | 1/1993 | Muramatsu | |
| 5,219,051 A | 6/1993 | Davis | |
| 5,249,783 A | 10/1993 | Davis | |
| 5,305,981 A | 4/1994 | Cunningham et al. | |
| 5,318,156 A | 6/1994 | Davis | |
| 5,332,070 A | 7/1994 | Davis et al. | |
| 5,433,421 A | 7/1995 | Ishiyama | |
| 5,803,213 A | 9/1998 | Davis et al. | |
| 5,881,507 A | 3/1999 | Yoo et al. | |
| 5,918,865 A | 7/1999 | Osterberg | |

(Continued)

FOREIGN PATENT DOCUMENTS

EP 0539930 A1 5/1993

(Continued)

OTHER PUBLICATIONS

PCT Search Report dated May 12, 2006, PCT/US2006/004342.

*Primary Examiner* — Robert A Siconolfi
*Assistant Examiner* — Mariano Sy
(74) *Attorney, Agent, or Firm* — Ingrassia Fisher & Lorenz, P.C.

(57) ABSTRACT

A vibration isolating system is disclosed. The vibration isolating system comprises a passive mechanical system comprising a damping assembly, a first resilient member coupled in series with the damping assembly, and a second resilient member coupled in parallel with the series combination of the damping assembly and the first resilient member. The vibration isolating system further comprises a support member coupled in series with the passive mechanical system, a viscoelastic mount coupled to the support member, and a motion limiter coupled to the support member such that the passive mechanical system transmits a force to the support member when the passive mechanical undergoes longitudinal displacement greater than a predetermined displacement.

19 Claims, 5 Drawing Sheets

U.S. PATENT DOCUMENTS

| | | |
|---|---|---|
| 5,947,240 A | 9/1999 | Davis et al. |
| 5,979,882 A | 11/1999 | Osterberg |
| 5,992,584 A | 11/1999 | Moody |
| 6,003,849 A | 12/1999 | Davis et al. |
| 6,022,005 A * | 2/2000 | Gran et al. .................... 267/136 |
| 6,082,508 A | 7/2000 | Davis |
| 6,129,185 A | 10/2000 | Osterberg et al. |
| 6,265,741 B1 | 7/2001 | Schrems |
| 6,354,576 B1 | 3/2002 | Jacobs et al. |
| 6,390,254 B1 | 5/2002 | Bennett et al. |
| 6,454,063 B1 * | 9/2002 | Osterberg et al. ............. 188/379 |
| 6,464,213 B1 | 10/2002 | Kojima |
| 6,643,939 B2 | 11/2003 | Tajima et al. |
| 6,715,591 B2 | 4/2004 | Davis |
| 6,896,109 B2 | 5/2005 | Kelso et al. |
| 7,070,157 B2 | 7/2006 | Huprikar et al. |
| 7,182,188 B2 | 2/2007 | Ruebsamen et al. |
| 8,002,094 B2 * | 8/2011 | Ruebsamen et al. .......... 188/379 |
| 2005/0217954 A1 * | 10/2005 | Hindle et al. ................. 188/298 |
| 2010/0065390 A1 * | 3/2010 | Boyd et al. .................... 188/378 |

FOREIGN PATENT DOCUMENTS

| | | |
|---|---|---|
| FR | 642711 | 9/1928 |
| GB | 658532 | 10/1951 |
| GB | 1175255 | 12/1969 |
| GB | 1569157 | 6/1980 |

* cited by examiner

TWO STAGE VIBRATION ISOLATOR

TECHNICAL FIELD

Embodiments of the subject matter described herein relate generally to vibration isolators. More particularly, embodiments of the subject matter relate to two-stage, passive vibration isolators.

BACKGROUND

Various systems and components operate in an environment where they are subject to vibrations from surrounding objects. Such systems and components typically exhibit improved performance and/or accuracy when the vibrations are reduced or removed. Some exemplary systems include satellite payloads, which can be subjected to both large-amplitude vibrations during the launch to orbit around the Earth, as well as small-amplitude vibrations at a different frequencies than the large amplitude vibration while operating in orbit. Such payloads can be sensitive to vibrations. They can therefore benefit from appropriate vibration isolation. Particularly, damping elements are included in the vibration isolation. One example of a passive damping and isolation system is the D-STRUT® isolation strut, manufactured by Honeywell, Inc. of Morristown, N.J. The D-STRUT® isolation strut is a three-parameter vibration isolation system that mechanically acts like a spring ($K_A$) in parallel with a series spring ($K_B$) and damper ($C_A$) and is disclosed in U.S. Pat. No. 5,332,070 entitled "Three Parameter Viscous Damper and Isolator" by Davis et al. and U.S. Pat. No. 7,182,188 entitled "Isolator Using Externally Pressurized Sealing Bellows" by Ruebsamen et al. These patents are hereby incorporated by reference.

Isolation systems are typically tuned for a specific vibration amplitude and resonant frequency. As previously described, some systems can experience different vibration amplitudes at different frequencies. It can be difficult for a single passive isolation system to isolate both types of vibration. Accordingly, vibration isolation systems, such as those for space satellite payloads, are typically tuned to a desired resonant frequency to optimally isolate one vibratory amplitude and frequency at the expense of effectiveness in isolating the other. Isolation systems are often designed or tuned to isolate small-amplitude on-orbit vibrations. Consequently, a satellite payload will frequently experience unmitigated large-amplitude vibrations during launch to orbit. As a result, the satellite payload is often reinforced with certain features and/or structures to survive large amplitude vibrations. The reinforcing features require additional volume in the payload area and impose additional energy costs during launch. Additionally, while useful during launch, once in orbit the reinforcing features or structures typically have no utility.

It would be beneficial to design a single passive vibration isolator which can be tuned to reduce both small- and large-amplitude vibrations during launch and orbit of a satellite payload. Other systems besides satellite systems may similarly benefit from such vibration isolation.

BRIEF SUMMARY

A vibration isolating system is disclosed. The vibration isolating system comprises a passive mechanical system comprising a damping assembly, itself comprising, a housing having an inner surface defining a housing passage therethrough, a first bellows disposed within the housing passage, the first bellows spaced apart from the inner surface to define a first chamber having a first volume, a second bellows disposed within the housing passage, the second bellows spaced apart from the housing inner surface to define a second chamber having a second volume, a restrictive flow passage in fluid communication with the first and second chambers, and a piston coupled to at least the second bellows and disposed within the housing passage, the piston configured to receive a first force to thereby move the piston through the restrictive flow passage to increase the first volume and decrease the second volume. The passive mechanical system further comprises a first resilient member coupled in series with the damping assembly, and a second resilient member coupled in parallel with the series combination of the damping assembly and the first resilient member. The vibration isolating system further comprises a support member coupled in series with the passive mechanical system, a viscoelastic mount coupled to the support member, and a motion limiter coupled to the support member such that the passive mechanical system transmits a force to the support member when the passive mechanical undergoes longitudinal displacement greater than a predetermined displacement.

Another vibration isolating system is disclosed. The vibration isolating system comprises a passive mechanical system, itself comprising a damping assembly comprising housing having a first end, a second end, an inner surface, and a passage defined by the inner surface extending between the first and second ends, a first bellows disposed within the passage and having a first bellows end, a second bellows end, and a first bellows outer surface, the first bellows end coupled to the first end, the second bellows end having a first bellows end surface, and the first bellows outer surface and inner surface of the housing defining a first chamber having a first volume, a second bellows disposed within the passage and having a third bellows end, a fourth bellows end, a second bellows inner surface, and a second bellows outer surface, the third bellows end coupled to the fourth bellows end, the second bellows inner surface defining a cavity therein, and the second bellows outer surface and inner surface of the housing defining a second chamber having a second volume, and a piston disposed within the passage, the piston having a shaft having a first section, a second section and a shaft outer surface, the first section at least partially disposed in the second chamber, the second section at least partially disposed outside of the second chamber and defining a flowpath with the inner surface of the housing, the flowpath in fluid communication between the first and second chambers, at least a portion of the shaft outer surface between the first and second sections coupled to the fourth bellows end, the piston configured to receive a first force to thereby move the piston through the restrictive flow passage to increase the first volume and decrease the second volume. The passive mechanical system further comprises a first resilient member coupled in series with the damping assembly, and a second resilient member coupled in parallel with the series combination of the damping assembly and the first resilient member. The vibration isolating system further comprises a support member coupled in series with the passive mechanical system, a viscoelastic mount coupled to the support member, and a motion limiter coupled to the support member such that the passive mechanical system transmits a force to the support member when the passive mechanical undergoes longitudinal displacement greater than a predetermined displacement.

Another vibration isolating system is disclosed. The vibration isolating system comprises a passive mechanical system, itself comprising a damping assembly comprising a housing having a first end, a second end, an inner surface, and a passage extending between the first and second ends, and an isolation assembly disposed in the passage and at least partially enclosed by the housing, the isolation assembly adapted to receive a force and to extend toward the first end of the housing in response to receiving the force. The passive mechanical system further comprises a first resilient member coupled in series with the damping assembly, and a second resilient member coupled in parallel with the series combination of the damping assembly and the first resilient member. The vibration isolating system further comprises a support member coupled in series with the passive mechanical system, a viscoelastic mount coupled to the support member, and a motion limiter coupled to the support member such that the passive mechanical system transmits force to the support member when the passive mechanical undergoes longitudinal displacement greater than a predetermined displacement.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 4:
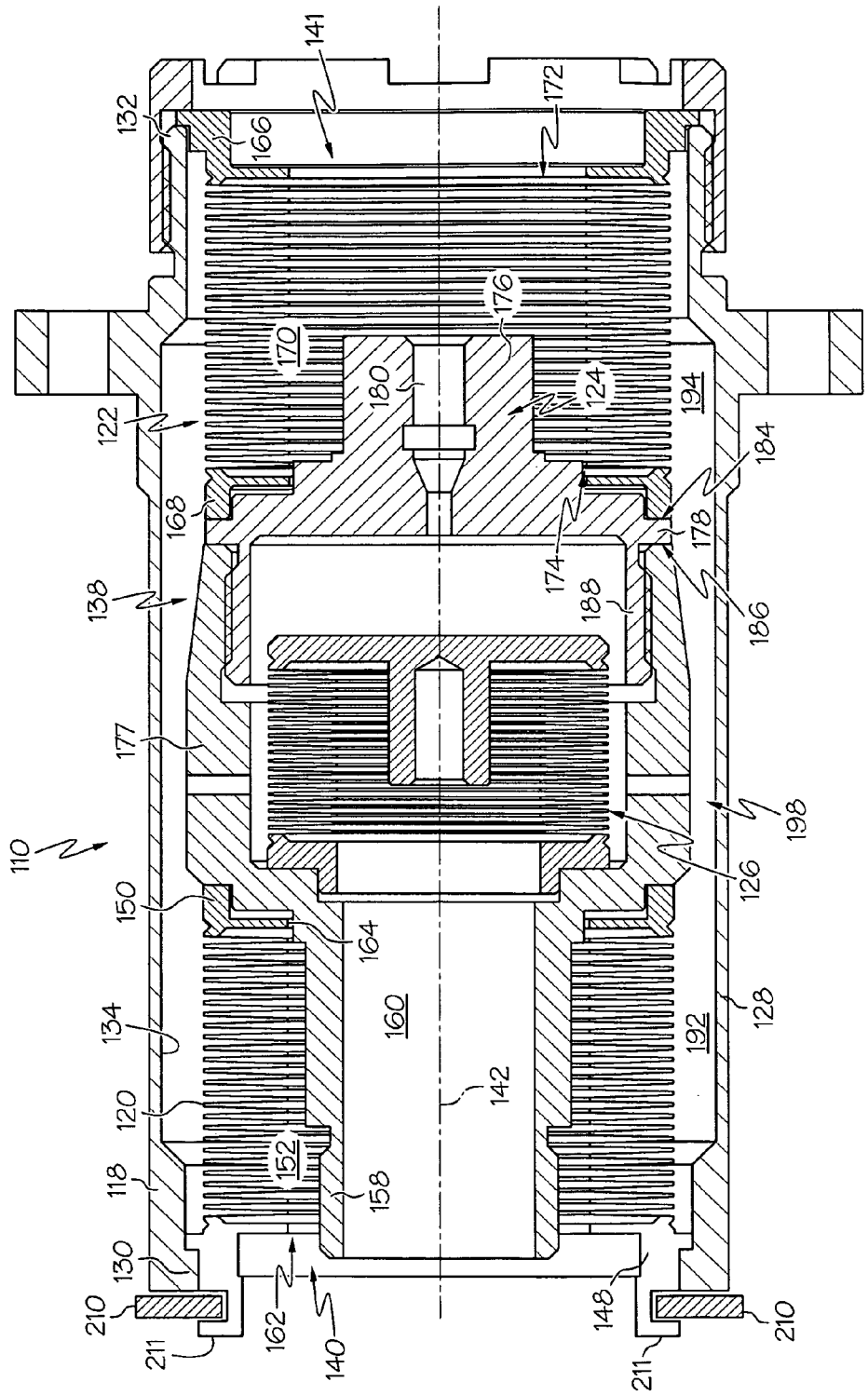
FIG. 4 is a close up view of a section of the exemplary isolator of FIG. 3.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic shown in FIG. 4 depicts one exemplary arrangement of elements, additional intervening elements, devices, features, or components may be present in an embodiment of the depicted subject matter.

"Adjust"—Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "interior", and "exterior" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

A two stage vibration isolator can reduce large-amplitude vibrations at a first resonant frequency and small-amplitude vibrations at a second, lower resonant frequency. The two stage isolator can provide both damping and linear-elastic vibration isolation for both low- and high-amplitude vibrations. Additionally, a stop or motion limiter can be used to contact a piston and transmit the force to a viscoelastomeric member, which functions as a viscoelastic damper and isolator for high-amplitude vibrations. In this way, both high- and low-amplitude vibrations can be isolated with a single passive device.

Figure 1:
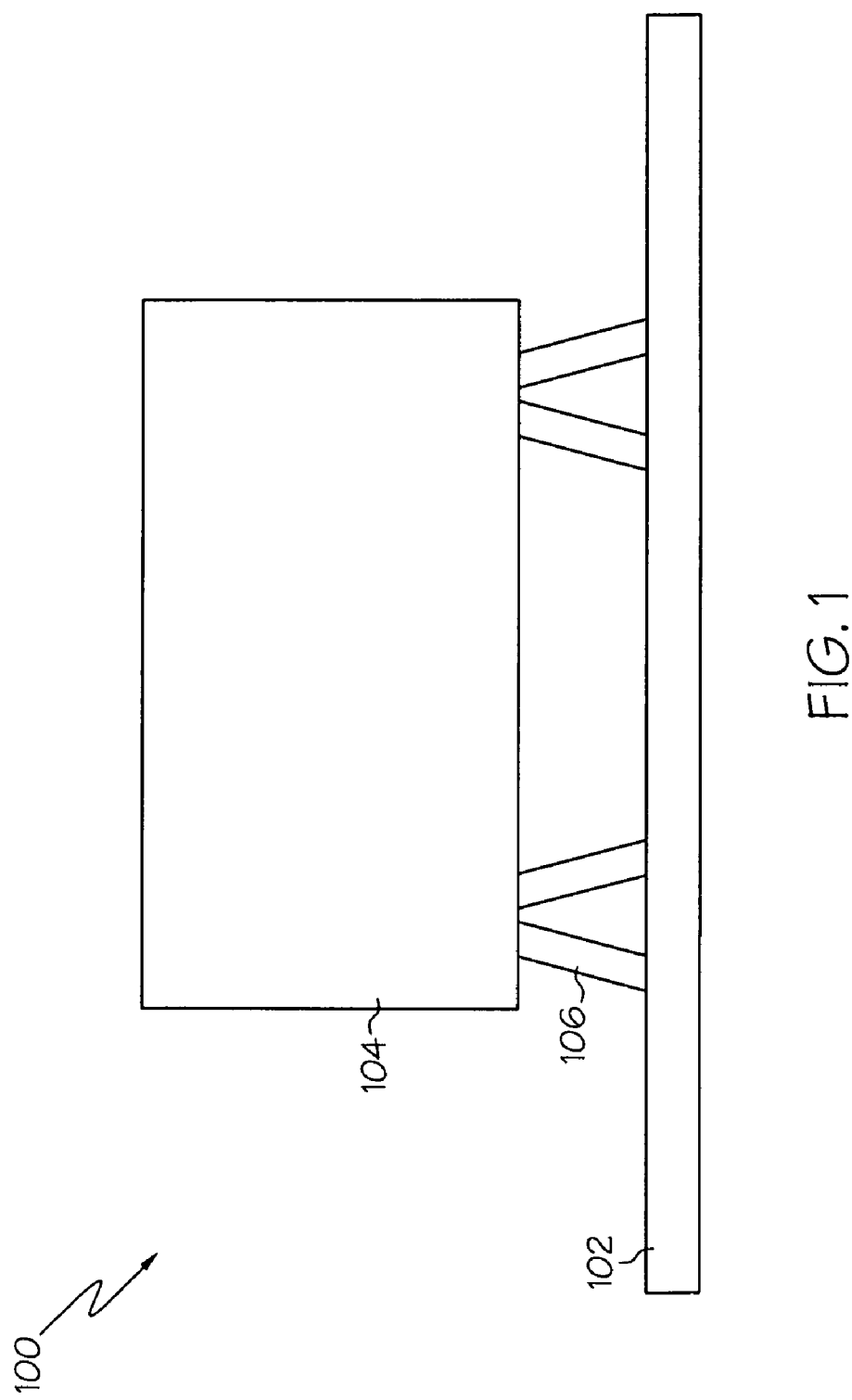
FIG. 1 is a schematic of an exemplary system having two stage vibration isolators.

FIG. 1 illustrates an exemplary system having vibration isolation with damping and resilient members. The system 100 may be implemented in any one of numerous environments, such as in space, terrestrially, or under water. The system 100 includes a base 102, a payload 104, and at least one damping device or vibration isolation apparatus 106. The base 102 is configured to provide a platform to which the payload 104 and vibration isolation apparatus 106 are coupled and may be any one of numerous application-appropriate devices. For example, in a space application, the base 102 can be a satellite, an arm of a satellite, a space station, or any one of numerous other conventionally-used space apparatus. The payload 104 is a device that preferably needs vibration damping and isolation to operate effectively. The payload 104 may be any one of numerous devices, such as, for example, a telescope or a camera.

The vibration isolation apparatus 106 dampens and isolates vibration that may be experienced by the payload 104 and thus, is coupled between the payload 104 and the base 102. Although a single vibration isolation apparatus 106 may be used, it may be preferable to employ more than one vibration isolation apparatus 106. In one exemplary embodiment, three vibration isolation apparatus 106 are used in a tripod configuration to isolate vibration. In another exemplary embodiment, six vibration isolation apparatus 106 are implemented in a hexapod configuration to provide vibration isolation along six degrees of freedom. In other embodiments, two or more vibration isolation apparatuses 106 can be employed to isolate vibrations in any desired configuration.

Figure 2:
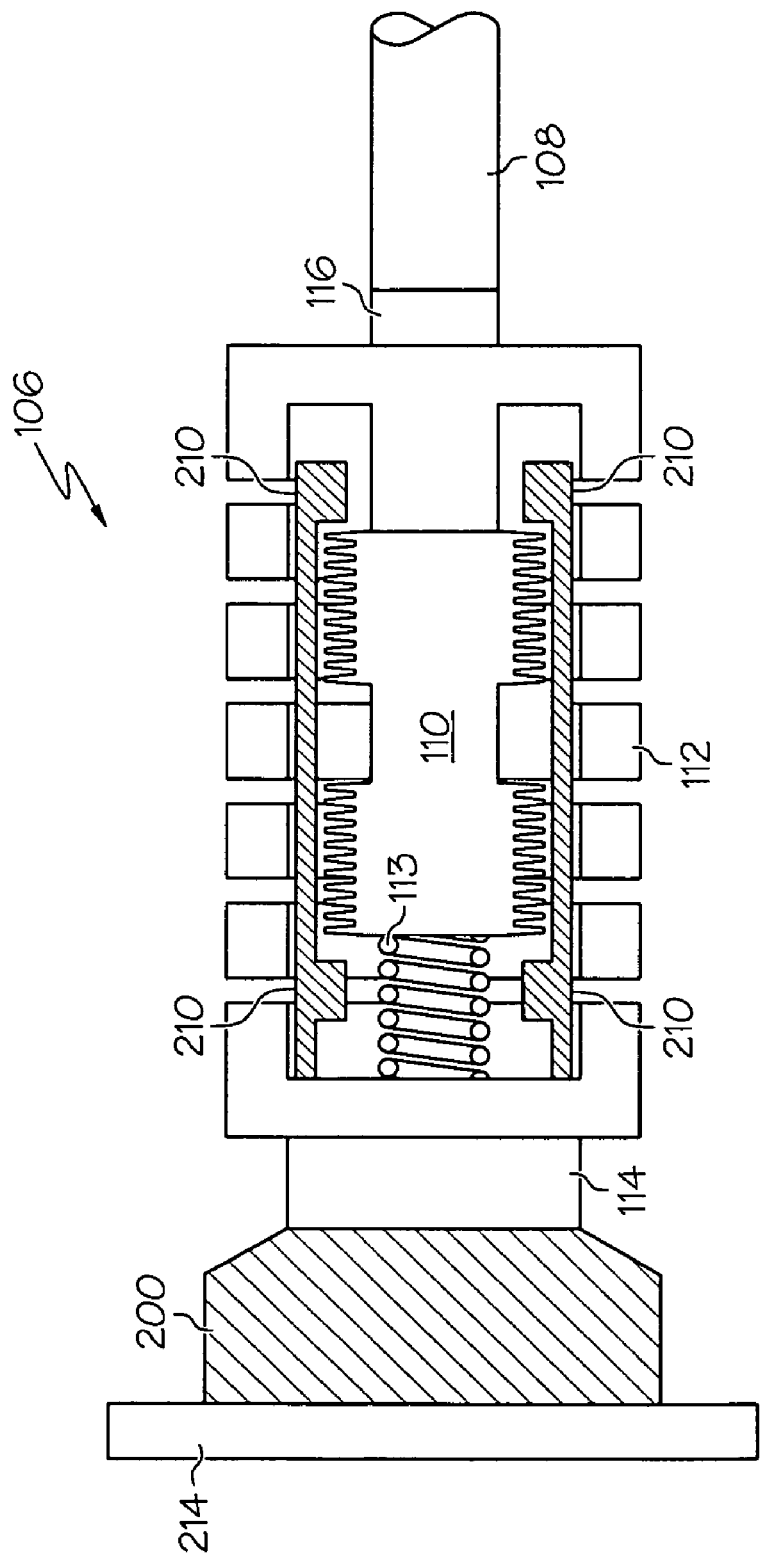
FIG. 2 is a cross-sectional view of an exemplary isolator that may be implemented in the system of FIG. 1.

With reference now to FIG. 2, a diagram of an exemplary two stage vibration isolation apparatus 106 is provided. The vibration isolation apparatus 106 includes a pivot 108, an isolation or damper assembly 110, an outer resilient housing or segment 112, an inner resilient housing or segment 113, a support 114, a viscoelastic mount 200, internal stops 210, and a mount plate 214. The pivot 108 receives vibratory motion from the base 102 and couples the base 102 to the vibration isolation apparatus 106. The outer resilient segment 112 operates along a parallel path to the series combination of the damper assembly 110 and inner resilient segment 113, together damping and isolating the received vibratory motion. The damper assembly 110 travels within the outer resilient segment 112 up to the internal stops 210.

The inner and outer resilient segments 112, 113 can be metal or elastomeric components. Each preferably has a predetermined stiffness which can be varied depending on the frequencies expected for an application of the vibration isolation apparatus. Thus, the inner and outer resilient segments 112, 113 are not limited to particular shapes, and can incorporate other features, such as shielding or protective housing features, if desired. The resilient segments can be springs, having form and features typical of a spring, including linear stiffness, in some embodiments. The inner and outer resilient segments 112 can comprise additional elements and features without limitation, such as coatings, mounting or fastening attachments, and so on, as appropriate for the embodiment.

The internal stops 210, which are coupled to and stationary relative to the support 114, inhibit extreme movement of the damper assembly 110. Similarly, extreme movement of the outer resilient segment 112 is inhibited, as shown in FIG. 2. The amplitude of displacement of the damper assembly 110 permitted prior to contacting a stop can be adjusted by varying the position of the internal stops 210 within the outer resilient segment 112. When displaced towards the left or right by a force from the pivot 108, the damper assembly 110 contacts the internal stop 210 after traveling a maximum distance. Before traveling the maximum distance, as limited by the internal stops 210, the damper assembly 110 can damp the vibration received, and maintain contact with the support 114 through the inner resilient segment 113. After contacting the internal stops 210, however, the damper assembly 110 has reduced damping performance, and the vibrations are additionally isolated by the resilience of the viscoelastic mount 200. Accordingly, force from the pivot 108 in the form of vibratory motion is transmitted semi-rigidly to the viscoelastic mount 200 once the amplitude exceeds the amount permitted by the internal stops 210.

The viscoelastic mount 200 can be coupled to a mount plate 214. The mount plate 214 can be a surface of the payload 104, or coupled to the payload 104. Accordingly, the vibration isolation apparatus 106 couples the payload 104 to the base 102 and inhibits vibratory motion from travelling from the base 102 to the payload 104. The vibration isolation apparatus 106 provides different vibration isolation responses for those vibrations which are low-amplitude, such as those which do not cause the damper assembly 110 to contact the internal stops 210, than for those which are high-amplitude, causing contact between the damper assembly 110 to contact the internal stops 210.

Figure 3:
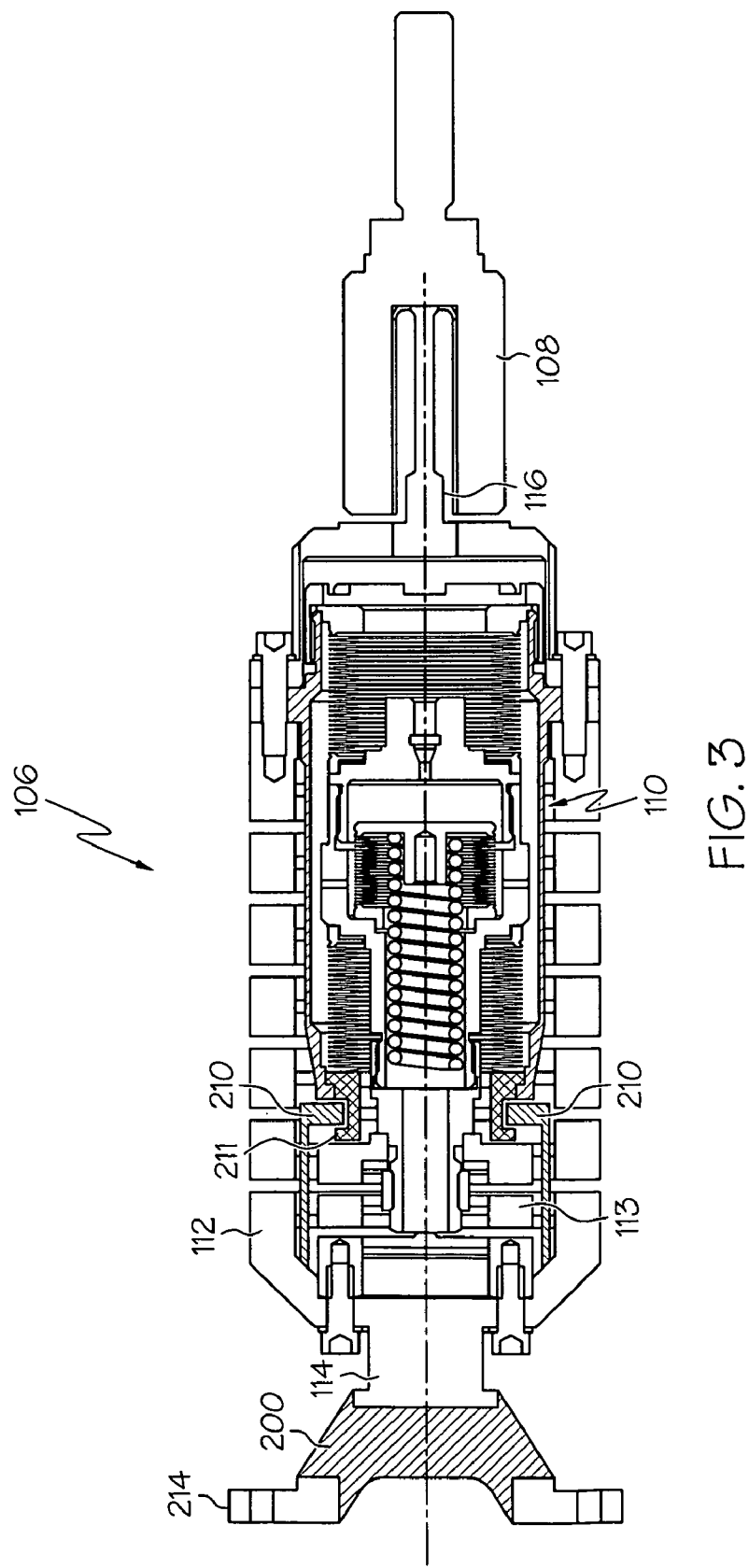
FIG. 3 is a detailed view of the cross-sectional view of an exemplary isolator that may be implemented in the system of FIG. 1.

The damper assembly 110 is coupled to the pivot 108 via a shaft 116. The outer resilient segment 112 can protect the damper assembly 110 from intrusion by foreign objects, as well as from impact damage and is configured to house the damper assembly 110 therein. The outer resilient segment 112, as previously mentioned, can comprise a spring, or other linear or non-linear elastic element. As shown in FIG. 3, the support 114 can attach the vibration isolation apparatus 106 to the base 102 and may be either integrally formed as part of the outer resilient segment 112 or may be a separate piece coupled to the outer resilient segment 112. FIG. 3 illustrates a more detailed view of the assembly shown in FIG. 2, and references made to one can be viewed in the other.

With reference to FIG. 2, the internal stop 210 preferably operates as, or cooperates with, a motion limiter 211. The internal stop 210 can be present in any embodiment of the two stage vibration isolation apparatus 106. Although shown as coupled to the outer resilient segment 112 along supports, in other embodiments, the internal stop 210 can be supported by different components, including the support 114. Preferably, the internal stop 210 is positioned to inhibit motion of the damping element, here the damper assembly 110, in a direction toward or away from the payload or other isolated component once the damper assembly 110 exceeds the desired motion limit. The internal stop 210 is stationary relative to the support 114, and can be contacted by the motion limiter 211. The motion limiter 211, which can be integral with the first end plate 148, as shown in FIG. 4, or a separate component, can at least partially surround the internal stop 210, as shown. The motion limiter 211 can arrest movement of the damper assembly 110 by contacting the internal stop 210 in either direction, as shown. The amplitude of displacement permitted for the damper assembly 110 can be adjusted by adjusting the position of the internal stops 210, the distance between the internal stops 210 and motion limiter 211, or both.

Thus, as shown in FIG. 2, the damper assembly 110 can move to either side when experiencing a force during vibratory excitement. The internal stop 210 as contacted by the motion limiter 211, however, prevents motion of the damper assembly 110 past a certain amplitude. The amount of permitted displacement can be tuned or configured to permit greater amplitude toward one direction or other, if desired for the embodiment. In certain embodiments, the permitted displacement in either direction can be the same.

Accordingly, the damper assembly 110, via the motion limiter 211, will contact a surface of the internal stop 210 and transmit force directly to the internal stop 210. Because the internal stop 210 is coupled to the support 114, the force will be transmitted directly to the viscoelastic mount 200. The viscoelastic mount 200, therefore, provides additional resilience and damping during vibrations which have amplitudes exceeding those permitted by the motion limiter 211 and internal stops 210.

In certain embodiments, the viscoelastic mount 200 can be present on the internal stop 210, rather than near the support 214. Thus, the internal stop 210 can be formed of a metal sufficiently strong to transmit loads from the damper assembly 110, or it can include viscoelastic materials. The viscoelastic mount 200, similarly, is preferably formed from a resilient material, such as rubber, silicone, and so on. The exact properties and composition of the viscoelastic mount 200 can vary between embodiments according to produce vibration isolating and damping characteristics desired for specific embodiments. Accordingly, when used herein, viscoelastic can include elastomers and viscoelastomers which exhibit both resilient and viscous properties, the exact degree of which can vary between embodiments.

FIG. 4 illustrates a close-up view of the exemplary damper assembly 110 of FIG. 3. The damper assembly 110 includes an assembly housing 118, a first bellows 120, a second bellows 122, a piston assembly 124, fluid and, optionally, a temperature compensation device 126. The assembly housing 118 is configured to operate with the other components of the damper assembly 110 to provide a fixed volume of space and to enclose and seal the fluid therein. The assembly housing 118 includes at least a tube 128 that has a first end 130, a second end 132, and an inner surface 134 that defines a passage 138 extending between the first and second ends 130, 132. The assembly housing 118 also includes a longitudinal axis 142 along which the components in the passage 138 may travel. Preferably, the first end 130 includes an inlet 140, the second end 132 includes an outlet 141, and the tube 128 has no openings other than the inlet 140 and outlet 141. However, in alternate embodiments, the tube 128 may be a single component having endwalls integrally formed or coupled to each of the first and second ends 130, 132.

The internal stop 210 is shown extending radially inward from the assembly housing 118. The motion limiter 211 is shown partially surrounding the internal stop 210, in an undisplaced position. As can be seen, any motion of the damper assembly 110 to the left or right which exceeds a certain amplitude will engage the motion limiter 211 with the internal stop 210, altering the vibration response of the assembly. Thus, motion of the assembly housing 118 toward the left is arrested by the internal stop 210, which can be positioned as desired for each embodiment. Similarly, motion of the assembly housing 118 toward the right also can be arrested by the internal stop 210 and motion limiter 211.

Figure 5:
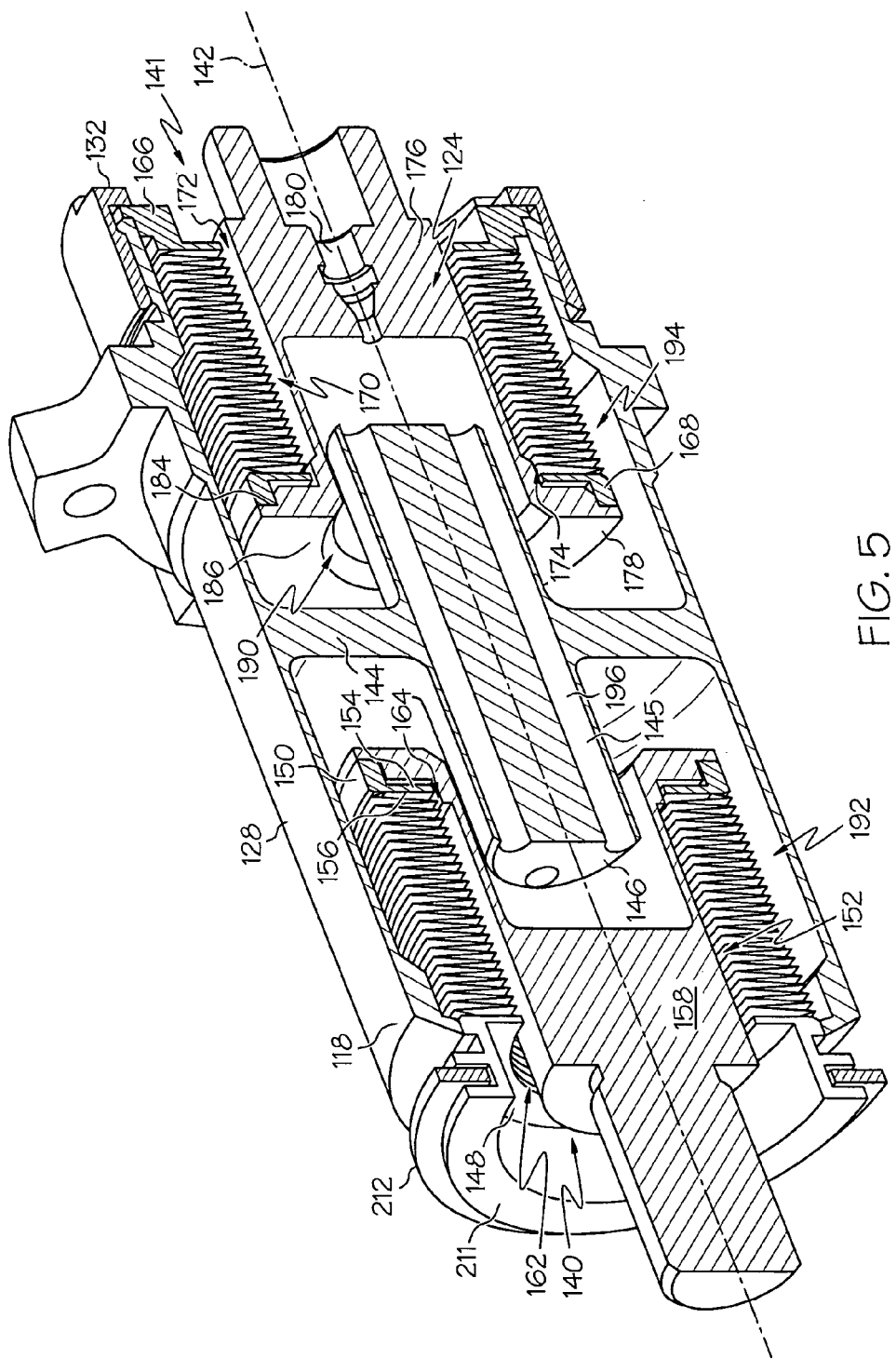
FIG. 5 is a cross-sectional view of another exemplary isolator that may be implemented in the system of FIG. 1.

In one exemplary embodiment, such as illustrated in FIG. 5, the assembly housing 118 includes a damping plate 144 disposed in the middle thereof. The damping plate 144 is integrally formed or integrated as part of the assembly housing 118 and includes at least one duct 145 that extends through the damping plate 144. The damping plate 144 can include a pipe 146 that extends axially outward from substantially the center of each side of the damping plate 144 along the longitudinal axis 142. In such an embodiment, the ducts 145 also extend through the pipe 146.

Returning to FIG. 4, the first bellows 120 is disposed within the assembly housing 118 and is preferably configured to move along the longitudinal axis 142. The first bellows 120 is coupled at one end to a first end plate 148 and at an opposite end to a second end plate 150 to thereby define first bellows interior cavity 152 therebetween. The first end plate 148 sealingly mates with the assembly housing first end 130 and couples the first bellows 120 thereto. The second end plate 150 couples to a support shaft 158 that is disposed within the first bellows interior cavity 152.

The support shaft 158 is configured to provide structural support for the first bellows 120 and guides the first bellows 120 along the longitudinal axis 142 during operation. The support shaft 158 may itself include a cavity 160 configured to receive other damper assembly 110 components therein. It will be appreciated that each of the first and second end plates 148, 150 include openings 162, 164 formed therein that are configured to accommodate components that may extend outside of the assembly housing 118, such as the temperature compensation device 126, shown in FIG. 4, the damping plate pipe 146, illustrated in FIG. 5, or support shaft 158.

Similar to the first bellows 120, the second bellows 122 is disposed within the assembly housing 118, is coupled to a first and a second end plate 166, 168, and is preferably configured to move along the longitudinal axis 142. Although depicted in FIG. 4 as being capable of traveling along the same axis 142 as the first bellows 120, it will be appreciated that in other non-illustrated embodiments the second bellows 122 may move along any other suitable axis. The second bellows first end plate 166 sealingly mates with the assembly housing second end 132 and couples the second bellows 122 thereto. The second bellows second end plate 168 is coupled to the opposite end of the second bellows 122 and, together with the first end plate 166 and inner surface of the second bellows 122, defines an interior cavity 170. Just as above, each of the first and second end plates 166, 168 include openings 172, 174 formed therein that are configured to provide space for disposal of components that may extend outside of the assembly housing 118, in this case, the piston assembly 124 or shaft 116 (shown in FIG. 3).

The piston assembly 124 is configured to operate with the first and second bellows 120, 122 to damp and isolate vibration received from the shaft 116 (shown in FIG. 3), together with the viscoelastic mount 200. The piston assembly 124 is disposed within the assembly housing 118 and is coupled between the first and second bellows 120, 122. The piston assembly 124 includes a piston shaft 176 and piston flange 178. The piston shaft 176 may be embodied as a single piece or multiple pieces (for example, shaft 176 and section 177, as shown in FIG. 4) and is aligned along the longitudinal axis 142 and is disposed in the second bellows interior cavity 170. The piston shaft 176 has an end that is coupled to the shaft 116 and another end that is coupled to the piston flange 178. In one exemplary embodiment, the piston shaft 176 extends through the second end plate opening 174 of the second bellows 122 and is coupled directly to the shaft 116. It will be appreciated, however, that the piston shaft 176 may be coupled to the shaft 116 in any other suitable manner to receive vibratory motion therefrom.

The piston shaft 176 includes a flowpath 180 extending at least partially therethrough for receiving fluid. In one exemplary embodiment, one section of the flowpath 180 has threaded walls that are configured to mate with a set screw.

The piston flange 178 extends radially outward from the piston shaft 176 and may be either formed integrally as part of the piston shaft 176 or may be separately constructed and subsequently attached to the piston shaft 176. The piston flange 178 includes an inner surface 184 and an outer surface 186. The inner surface 184 is sealingly coupled to the second bellows second end plate 168. The outer surface 186 may have any one of numerous configurations. However, in the embodiment shown in FIG. 4, the outer surface 186 is coupled to the first bellows 120 via another section of the piston 177. As such, the outer surface 186 includes an extension 188 that mates with the piston section 177. The piston section 177, in turn, is coupled to the first bellows second end plate 150. In another exemplary embodiment, the outer surface 186 is configured to couple to the first bellows 120 and the outer surface 186 is directly coupled to the first bellows second end plate 150.

As briefly mentioned previously, the damper assembly 110 components are preferably configured to operate together to sealingly enclose the fluid therein in a fixed volume of space. The volume of space is separated into subvolumes, each of which is disposed in a first chamber 192, a second chamber 194, and a restrictive flow passage 196. The first chamber 192 is defined by a portion of the assembly housing inner surface 134 and an outer surface of the first bellows 120, and the second chamber 194 is defined by another portion of the assembly housing inner surface 134 and an outer surface of the second bellows 122.

In one exemplary embodiment, a damping annulus 198, defined by the piston section 177 and assembly housing inner surface 134, acts as the restrictive flow passage. In another exemplary embodiment, the restrictive flow passage 196 is defined by the ducts 145 that are formed in the damping plate pipe 146, as shown in FIG. 5. Also in FIG. 5, the internal stop 212, as surrounded by the motion limiter 211, is present to arrest movement of the assembly housing 118 and transmit force to the viscoelastic mount 200. The internal stop 212 can be positioned in a different location to adjust the amplitude of expansion of the first and second bellows 120, 122.

In still another embodiment, the restrictive flow passage 196 is defined by ducts 145 formed in the damping plate 144. No matter the particular configuration, the first chamber 192, second chamber 194, and restrictive flow passage(s) 196 are filled with fluid. Thus, during the operation of the damper assembly 110, when a force is exerted on the piston assembly 124, fluid is pushed from the second chamber 194, through the restrictive flow passage 196, into the first chamber 192.

As illustrated in FIG. 4, the temperature compensation device 126 may be included in the damper assembly 110 to compensate for fluid expansion and/or contraction in response to temperature changes. The temperature compensation device 126 may have any one of numerous suitable configurations and may be disposed within the damper assembly 110 in any one of numerous manners.

The above description relates to a two stage vibration isolator. During operation, the isolation strut is capable of transmitting fluid pressure from its moving piston to the sealed bellows outer surfaces, which can displace a certain amount prior to contacting an internal stop. Prior to contacting the internal stop, the vibration isolator can provide a well-damped response with tuned resonant frequency, suitable for low-amplitude vibrations. Once exceeding the permitted displacement of the isolation assembly, large-amplitude vibrations are isolated by the viscoelastic mount, as well as any residual stiffness and damping within the isolation assembly. Thus, the vibration isolator is capable of providing a first well-damped isolation response to low-amplitude vibrations at a first resonant frequency, and a second response for high-amplitude vibrations at a second resonant frequency.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A vibration isolating system, comprising:
a passive mechanical system comprising:
a damping assembly comprising:
a housing having an inner surface defining a housing passage therethrough;
a first bellows disposed within the housing passage, the first bellows spaced apart from the inner surface to define a first chamber having a first volume;
a second bellows disposed within the housing passage, the second bellows spaced apart from the housing inner surface to define a second chamber having a second volume;
a restrictive flow passage in fluid communication with the first and second chambers;
a piston coupled to at least the second bellows and disposed within the housing passage, the piston configured to receive a first force to thereby move the piston through the restrictive flow passage to increase the first volume and decrease the second volume;
a first resilient member coupled in series with the damping assembly; and
a second resilient member coupled in parallel with the series combination of the damping assembly and the first resilient member;
a support member coupled in series with the passive mechanical system;
a viscoelastic mount coupled to the support member; and
a motion limiter coupled to the support member such that the passive mechanical system transmits a force to the support member when the passive mechanical undergoes longitudinal displacement greater than a predetermined displacement.

2. The vibration isolating system of claim 1, wherein the piston has an outer surface and the restrictive flow passage is defined by the piston outer surface and a first section of the housing inner surface.

3. The vibration isolating system of claim 2, wherein the piston is coupled to the first bellows.

4. The vibration isolating system of claim 1, wherein the housing has an exterior surface and the viscoelastic mount is coupled to the exterior surface.

5. The vibration isolating system of claim 1, wherein the piston is further adapted to decrease the first volume and increase the second volume in response to receiving a third force.

6. The vibration isolating system of claim 1, wherein the viscoelastic mount comprises rubber.

7. The vibration isolating system of claim 1, wherein the motion limiter is adapted to contact an internal stop in response to motion of the first bellows in a second longitudinal direction opposite a first longitudinal direction beyond a second predetermined displacement.

8. The vibration isolating system of claim 1, further comprising:
a fluid disposed at least within the first chamber, the second chamber, and the restrictive flow passage; and
a temperature compensation device disposed within the housing passage and in contact with the fluid, the temperature compensation device configured to compensate for expansion and contraction of the fluid during temperature changes.

9. The vibration isolating system of claim 1, wherein the first bellows is biased to maintain the first chamber having the first volume.

10. An vibration isolating system comprising:
a passive mechanical system comprising:
a damping assembly comprising:
a housing having a first end, a second end, an inner surface, and a passage defined by the inner surface extending between the first and second ends;
a first bellows disposed within the passage and having a first bellows end, a second bellows end, and a first bellows outer surface, the first bellows end coupled to the first end, the second bellows end having a first bellows end surface, and the first bellows outer surface and inner surface of the housing defining a first chamber having a first volume;

a second bellows disposed within the passage and having a third bellows end, a fourth bellows end, a second bellows inner surface, and a second bellows outer surface, the third bellows end coupled to the second end, the second bellows inner surface defining a cavity therein, and the second bellows outer surface and inner surface of the housing defining a second chamber having a second volume; and a piston disposed within the passage, the piston having a shaft having a first section, a second section and a shaft outer surface, the first section at least partially disposed in the second chamber, the second section at least partially disposed outside of the second chamber and defining the passage with the inner surface of the housing, the passage in fluid communication between the first and second chambers, at least a portion of the shaft outer surface between the first and second sections coupled to the fourth bellows end, the piston configured to receive a first force to thereby move the piston through the passage to increase the first volume and decrease the second volume;

a first resilient member coupled in series with the damping assembly; and a second resilient member coupled in parallel with the series combination of the damping assembly and the first resilient member;

a support member coupled in series with the passive mechanical system;

a viscoelastic mount coupled to the support member; and a motion limiter coupled to the support member such that the passive mechanical system transmits a force to the support member when the passive mechanical undergoes longitudinal displacement greater than a predetermined displacement.

11. The isolator system of claim 10, further comprising a temperature compensator bellows coupled between the first bellows and the piston, the temperature compensator bellows configured to compensate for expansion and contraction of the fluid during temperature changes.

12. The isolator system of claim 11, wherein the first bellows includes an inner surface that defines a channel and the temperature compensator bellows is disposed within the first bellows channel.

13. The isolator system of claim 11, wherein the first bellows includes an inner surface that defines a channel and the temperature compensator bellows includes a housing, the temperature compensator bellows housing having a section disposed within the first bellows channel.

14. The isolator system of claim 10, further comprising a fluid disposed at least within the first chamber, the second chamber, and the flowpath.

15. The isolator system of claim 14, wherein the fluid is a liquid.

16. The isolator system of claim 10, wherein the viscoelastic mount comprises a rubber mount.

17. The isolator system of claim 10, wherein the viscoelastic mount comprises a silicone mount.

18. An vibration isolating system comprising:
a passive mechanical system comprising:
a damping assembly comprising:
a housing having a first end, a second end, an inner surface, and a passage extending between the first and second ends; and
an isolation assembly disposed in the passage and at least partially enclosed by the housing, the isolation assembly adapted to receive a force and to extend toward the first end of the housing in response to receiving the force;
a first resilient member coupled in series with the damping assembly; and
a second resilient member coupled in parallel with the series combination of the damping assembly and the first resilient member;
a support member coupled in series with the passive mechanical system;
a viscoelastic mount coupled to the support member; and
a motion limiter coupled to the support member such that the passive mechanical system transmits force to the support member when the passive mechanical undergoes longitudinal displacement greater than a predetermined displacement.

19. The isolator system of claim 18, wherein the isolation assembly comprises a first bellows portion, a second bellows portion, and a restrictive passageway connecting the first and second bellows portions.

* * * * *